United States Patent [19]

Johnsen

[11] 4,248,475
[45] Feb. 3, 1981

[54] BOW ASSEMBLY FOR TRUCK BED COVERS

[76] Inventor: Walter Johnsen, Aurelia, Iowa 51005

[21] Appl. No.: 2,665

[22] Filed: Jan. 11, 1979

[51] Int. Cl.³ .............................................. B62D 25/06
[52] U.S. Cl. ..................................... 296/100; 296/104
[58] Field of Search .......................... 296/100, 104, 98

[56] References Cited

U.S. PATENT DOCUMENTS

| 2,969,284 | 1/1961 | Ambli | 296/100 |
| 3,384,413 | 5/1968 | Sargent | 296/100 |
| 3,785,694 | 1/1974 | Sargent | 296/100 |
| 3,971,590 | 7/1976 | Yglesias | 296/104 |
| 4,162,100 | 7/1979 | Muscillo | 296/100 |

FOREIGN PATENT DOCUMENTS 481176  2/1952  Canada ..................................... 296/104

*Primary Examiner*—Robert R. Song
*Attorney, Agent, or Firm*—Morton S. Adler

[57] ABSTRACT

A bow assembly is removably attachable to an open top truck bed for supporting a tarpaulin cover and includes a plurality of relatively light weight and easy to handle components for quick assembly and disassembly by one person. The assembled structure includes a plurality of spaced transverse bow units and headboard connected by longitudinally aligned removable supports with the bow units being telescopically slidable on supports attachable to the sideboards of the truck to permit flexing as cargo is loaded or unloaded. The headboard protects the cover from displacement by headwinds and includes means for deflecting water off the sides of the cargo bed.

4 Claims, 5 Drawing Figures

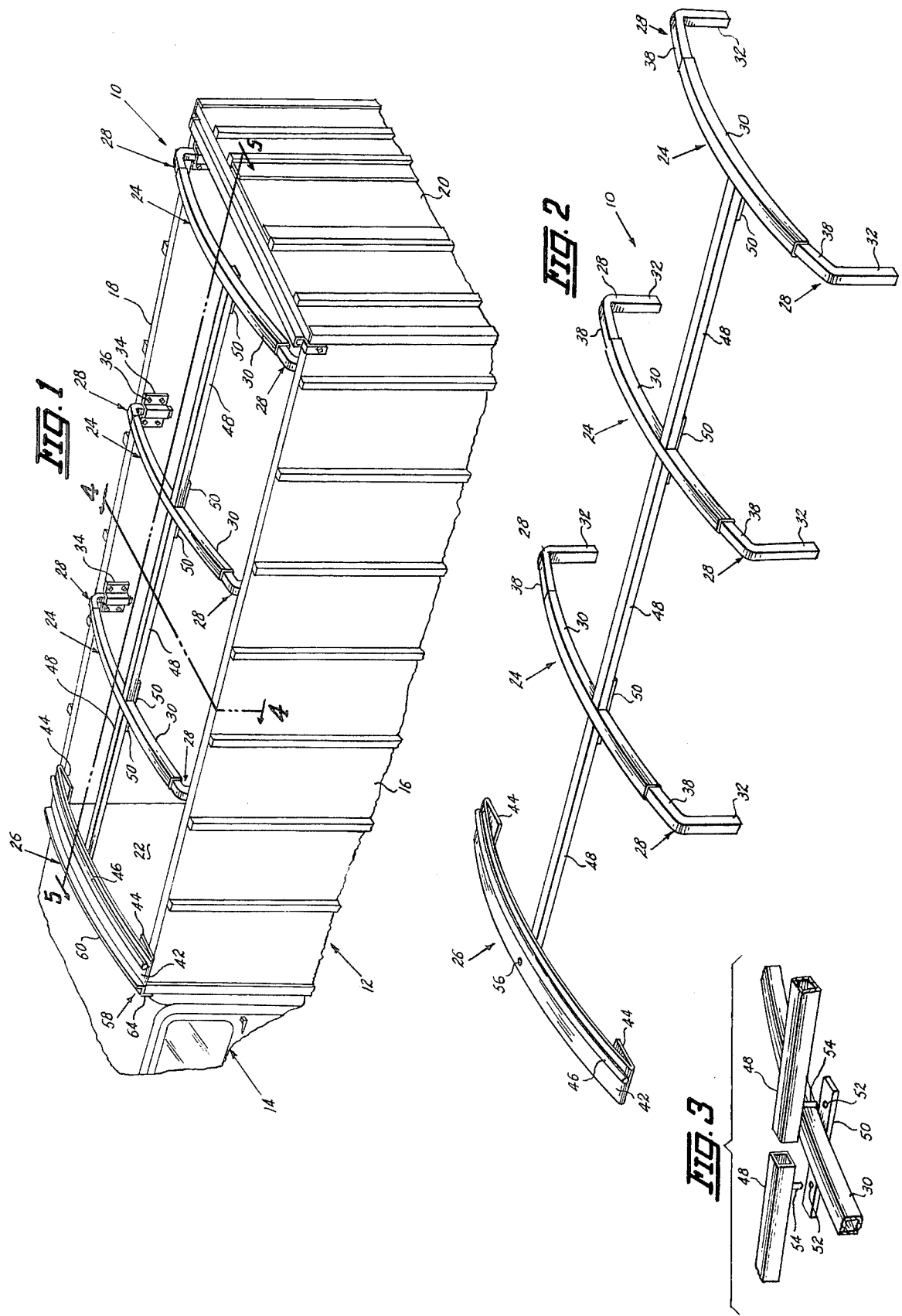

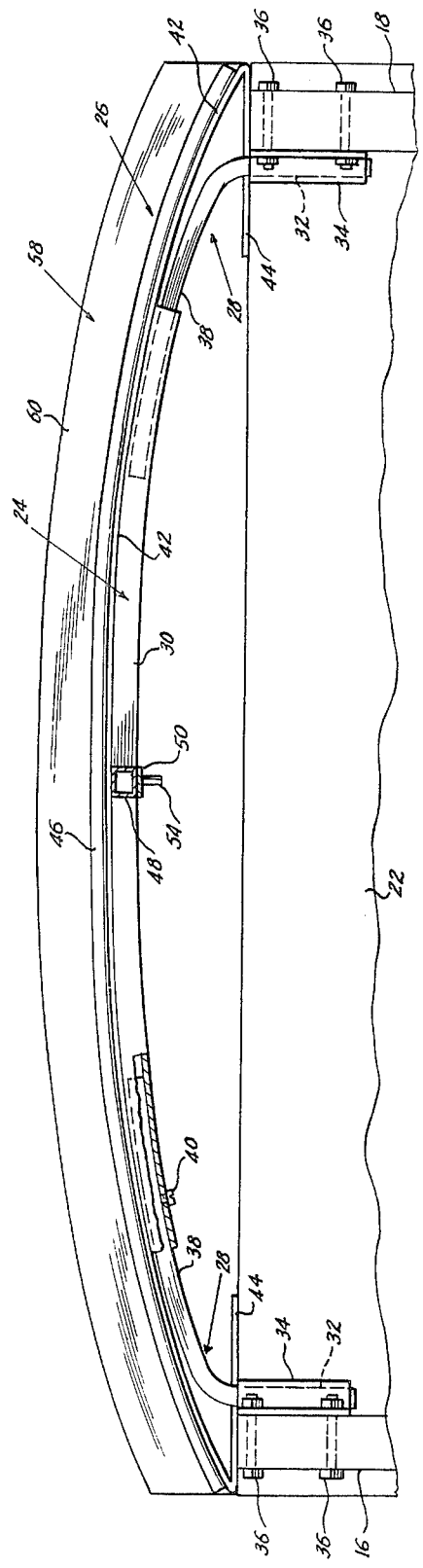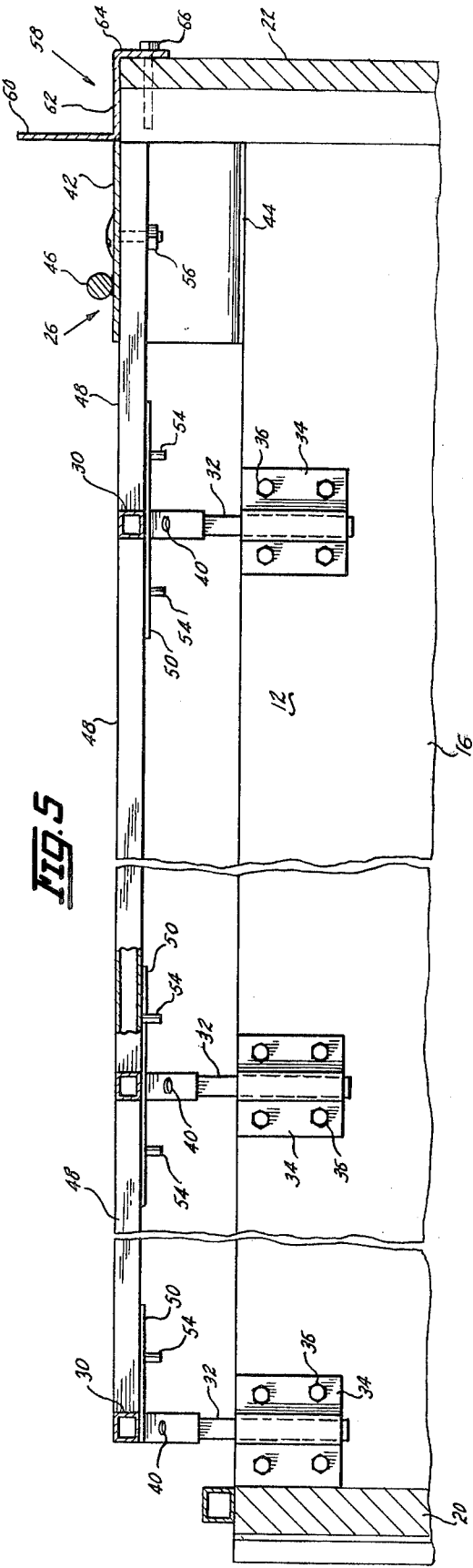

BOW ASSEMBLY FOR TRUCK BED COVERS

BACKGROUND OF THE INVENTION

This invention relates to improvements in a bow assembly for supporting a tarpaulin cover on an open top truck cargo bed.

It is common practice in the trucking industry to provide flexible covers for cargo in open top truck beds, semi-trailers and the like and since such covers must be frequently put in place and removed in the loading and unloading of cargo, it is desirable that this be able to be accomplished in a simple and easy manner and preferably by one operator.

Such covers are used both with and without supporting bow structures and many prior art disclosures are directed to various means for expediting the manipulation of the cover itself. However, since the use of bows has many advantages in the securing and tensioning of these flexible covers and in increasing their utility for shedding rain water and the like, one of the important objects herein is to provide an improved bow assembly which materially increases the ease and facility for handling by one operator. Prior endeavors to improve the construction of bows for such purposes are exemplified in U.S. Pat. Nos. 2,969,284, 3,384,413 and 3,785,694.

More particularly, it is an object herein to provide a bow assembly for supporting a tarpaulin cover on an open top truck cargo bed that comprises a plurality of separable parts, each of relative light weight for ease in handling, that can be quickly and easily assembled and mounted on the bed and quickly and easily removed and disassembled.

A further object is to provide a bow assembly of the above class which includes bow units telescopically slidably arranged relative to supports removably attachable to the cargo bed sideboards to not only aid in maintaining the sideboards in a vertical position but to permit them a reasonable amount of flexing as cargo is loaded or unloaded.

Another object is to provide a bow assembly as characterized which includes a headboard component mounted across the forward end of the truck bed that will direct rain water off the side of the bed and away from the cargo and, together with a complementary wind barrier will protect the cover from displacement by head winds.

Still another object herein is to provide a bow assembly of the above class in which undue strain on the sideboards is eliminated by the sliding capability of the bow units.

The foregoing objects and such further objects as may appear herein, or be hereinafter pointed out, together with the advantages of this invention will be more fully discussed and developed in the more detailed description of the accompanying drawings.

BRIEF DESCRIPTION OF THE DRAWINGS

FIG. 1 is a fragmentary perspective view of an open top truck cargo bed showing my new bow assembly mounted thereon, FIG. 2 is a perspective view of this bow assembly in assembled position, FIG. 3 is a perspective exploded view showing the longitudinal supports relative to the transverse bow unit, FIG. 4 is a cross sectional view taken from the line 4—4 of FIG. 1, and FIG. 5 is a cross sectional view taken from the line 5—5 of FIG. 1.

DESCRIPTION OF THE PREFERRED EMBODIMENT

Referring to the drawings, this new bow assembly is designated generally by the numeral 10 as best seen in FIG. 2 and is shown in use in FIG. 1 on an open top truck bed or cargo box 12 which may be a part of a truck vehicle represented by the fragmentary showing of a cab 14 or may be a separate unit such as a semi-trailer as is well known. For purposes of description, bed 12 includes the spaced upright sideboards 16, 18, the rear wall 20 and the front wall 22.

Bow assembly 10 includes a plurality of like bow units 24 depending in number upon the size of the cargo box 12, and a headboard unit 26. Each unit 24 comprises two like opposed angular end sections 28 of bar or tubular material and a central elongated arcuate hollow bow 30 here shown preferably of square tubular construction. One end 32 of each end section 28 is adapted for removable insertion into a socket plate 34 suitably secured to the inner side of a respective sideboard 16, 18 at the top portion thereof by nut and bolt means 36 and the other respective ends 38 of section 28 extend upwardly and inwardly from socket 34 towards but not to the center line of bed 12. Bows 30 are telescopically slidably mounted on respective opposed ends 38 of a pair of end sections 28 and a set screw 40 is provided on one section 28 to secure one end of bow 30 at any selected position and hold it against movement relative to such end 28. The other end of bow 30 and end 38 of section 28 on which it is journalled are freely telescopically movable relative to each other to accommodate any flexing of the sideboards 16, 18 as cargo is loaded and unloaded and thus eliminate any undue stress and strain on box 12.

Bow units 24 are disposed transversely of the longitudinal axis of box 12 in spaced relationship from the rear to the front thereof as seen in FIG. 1 and headboard 26 is provided for mounting across the top of front wall 22 parallel to units 24. Headboard 26 comprises an arcuate plate 42 corresponding in curvature to bows 30 and is turned back upon itself at each end to provide the bearing surfaces 44 for seating on the top edges of sideboards 16, 18. A rib or lip in the form of rod 46 is secured across the top of plate 42 near the trailing edge thereof and serves to deflect rain water away from the interior of box 12 as will later be referred to.

Bow units 24 are connected by a plurality of removably elongated support sections 48, preferably of tubular material, that add rigidity to the overall bow assembly 10 and provide a ridge line for support of a flexible cover (not shown) that is used on the cargo box 12 in a well known manner. Sections 48 are disposed transversely of bows 30 and extend in longitudinal alignment along the center longitudinal line of box 12 as seen in FIG. 1. The means for removably attaching supports 48 to bows 30 is shown in FIG. 3 which includes a bar 50 secured to the underside of bow 30 and transversely thereof so as to project therefrom and with a hole 52 provided in such projecting portion. Such projections are from each side of all bows except for the bow adjacent the rear wall 20 where, for obvious reasons, it is only from one side extending away from wall 20. Each end of each support 48 is provided with a depending stud 54 for seating in a respective hole 52 and easy removal. The forwardmost support 48 as best seen in FIG. 5 has a stud 54 on only one end for attachment to the forwardmost bow 30 and at its other end is secured to the underside of plate 42 on headboard 26 by the nut and bolt fastening means 56.

Thus far described, it will be appreciated that bow assembly 10 comprises a plurality of separable and easy to handle components that can be quickly and simply assembled on box 12 (FIG. 1) or disassembled if not needed. For the most part, no tools are required as the forwardmost support 48 can be left attached to headboard 26 although, if desired, these parts can be easily separated by removal of the fastener 56. By the use, preferably, of tubular material for bows 30, sections 28 and supports 48, such parts are relatively light in weight for easy handling by one operator.

Complementary to headboard 26, I have provided a wind barrier 58 across the top of the front wall 22 of box 12 as best seen in FIG. 5. Barrier 58 includes an upstanding windshield member 60 having the integral horizontal plate 62 terminating in the depending lip 64 for mounting on the top of wall 22 as shown. Lip 64 is secured to wall 22 by fastening screws 66. Preferably, windshield 60 is approximately two inches high although this may be varied and it is pointed out that barrier 58 can be left attached to box 12 even when assembly 10 is not in use.

In assemblying and mounting assembly 10 and headboard 26, one edge of plate 42 of headboard 26 will be in abutting relationship to the bottom portion of windshield 60 as best seen in FIG. 1. Thus arranged, any suitable type of flexible cover (not shown) can be placed across bed 10 to rest on and be supported by assembly 10 and it will be understood that suitable cover fasteners not material to the present invention are employed in a well known manner for securing the cover to box 12. At haedboard 26 it is intended that one end or edge of the cover used be trained against plate 42 so as to overlie lip 46 and be in juxtaposition to windshield 60. By this arrangement, shield 60 protects the cover from displacement by headwinds and lip 46 serves as a water seal or barrier to direct any water that might reach it towards the sideboards and onto the ground. Likewise, the curvature of the bows and the headboard 26 expedite the shedding of rain water on the cover to be placed thereon. Accordingly, in view of the foregoing, it is thought a full understanding of the construction and operation of this invention will be had and the advantages of the same will be appreciated.

I claim:

1. A bow assembly for supporting a flexible cover on an open top cargo box on a truck or trailer where such box includes spaced upright sideboards, a front wall and a rear wall, said assembly comprising:

a plurality of knockdown bow units adapted to be removably mounted on a cargo box transversely of the longitudinal axis thereof and in spaced relationship relative to said longitudinal axis, each bow unit comprising:
a pair of opposed end sections,
respective opposed means on said sideboards for removably receiving and supporting said end sections,
an arcuate bow,
said bow being disposed intermediate said end sections and removably telescopically slidably coupled thereto to accommodate flexing of said sideboards as cargo is loaded and unloaded,
a removable rigid link means interconnecting each bow with an adjacent bow,
an elongated arcuate headboard having a curvature complementary to that on said bows and adapted for mounting on said front wall so as to extend intermediate said sideboards in spaced relationship to said bows,
one of said respective rigid link means being removably secured to said respective headboard and an adjacent bow,
said rigid link means being longitudinally aligned relative to the apex of the curvature on said bows, and
a water deflector means on said headboard for directing water towards and off of said respective sideboards.

2. A bow assembly as defined in claim 1 including an upstanding wind barrier secured across said front wall so as to extend intermediate the sideboards of the cargo box and in abutting relationship to said headboard.

3. A bow assembly for supporting a flexible cover on an open top cargo box on a truck or trailer where such box includes spaced upright sideboards, a front wall and a rear wall, said assembly comprising:

a plurality of pairs of socket members secured respectively in opposed relationship to the upper portion of respective cargo box sideboards,
said pairs of socket members being disposed in spaced relationship longitudinally of the cargo box,
a plurality of angular bow end sections,
one end of each respective end section adapted for removable insertion into a respective socket member with the other respective end thereof extending therefrom in a curved path upwardly and inwardly toward but not to the center line of the cargo box,
a plurality of arcuate bows,
each bow telescopically slidably mounted at respective ends to the respective inwardly extending ends of a respective pair of bow end sections whereby said bows are disposed transversely of the longitudinal axis of the cargo box and in spaced relationship longitudinally thereof,
respective means on one end section of each pair thereof for securing the end of a bow thereon against movement relative thereto,
a respective support member extending from each bow to an adjacent bow and removably secured thereto,
said support members being longitudinally aligned relative to the apex of the curvature on said bows,
an elongated arcuate headboard having a curvature complementary to that on said bows and adapted for mounting on said front wall so as to extend intermediate said sideboards in spaced parallel relationship to said bows,
one of said respective support members being removably secured to said respective headboard and an adjacent bow, and
a water deflector means on said headboard for directing water towards and off of said respective sideboards.

4. A bow assembly as defined in claim 3 including an upstanding wind barrier secured across said front wall so as to extend intermediate the sideboards of the cargo box and in abutting relationship to said headboard.

* * * * *